United States Patent [19]

Lacey

[11] Patent Number: 4,573,831
[45] Date of Patent: Mar. 4, 1986

[54] CUTTER BLADE

[75] Inventor: Ralph W. Lacey, Grosse Point Parke, Mich.

[73] Assignee: Dijet Industrial Co., Ltd., Grosse Pointe, Mich.

[21] Appl. No.: 742,646

[22] Filed: Jun. 10, 1985

Related U.S. Application Data

[63] Continuation of Ser. No. 544,134, Oct. 21, 1983, abandoned.

[51] Int. Cl.⁴ .............................................. B26D 1/00
[52] U.S. Cl. ........................................ 407/42; 407/48; 407/58; 407/114
[58] Field of Search ................... 407/42, 15, 58, 114, 407/48

[56] References Cited

U.S. PATENT DOCUMENTS

| | | | |
|---|---|---|---|
| 3,701,187 | 10/1972 | Erkfritz | 407/58 |
| 3,813,747 | 6/1974 | Hertel | 407/113 |
| 3,875,631 | 4/1975 | Malinchak | 407/113 |
| 3,975,809 | 8/1976 | Sorice et al. | 407/114 |
| 4,215,957 | 8/1980 | Holma et al. | 407/114 |
| 4,425,063 | 1/1984 | Striegl | 407/113 |
| 4,531,864 | 7/1985 | Bylund | 407/114 |

FOREIGN PATENT DOCUMENTS 2431897  3/1980  France ................................ 407/114

Primary Examiner—Leonidas Vlachos
Attorney, Agent, or Firm—Price, Heneveld, Huizenga & Cooper

[57] ABSTRACT

A milling cutter blade with a notched cutting edge capable of being mounted at a desired negative or positive rake in a cutter body, the notches having side walls which, at the side face, diverge away from the cutting edge. The blade edge surfaces adjacent the cutting edges are of concave, generally V-shaped configuration with the junctures of these edge surfaces with the side faces being at an acute angle. A plurality of the blades are mounted in a cutter body to form a milling cutter assembly such that one portion of the configurated concavity V on the blade back edge surface is in reference engagement with a like oriented cutter body reference surface on a convex generally V-shaped back surface of a cutter body blade slot. The V-shaped concavity on the front edge surface of the blade cooperates with the adjacent chip pocket of the cutter body to discharge chips.

12 Claims, 9 Drawing Figures

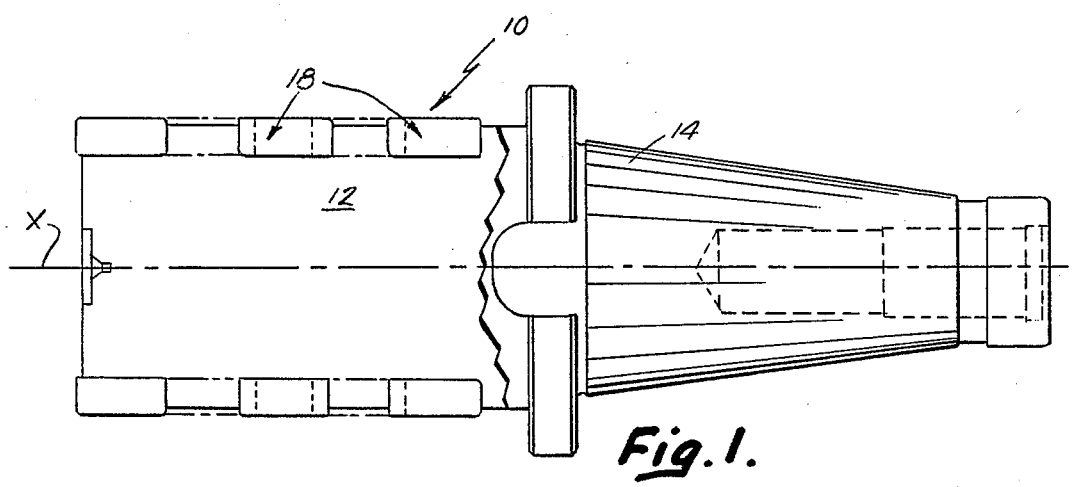
Fig. 1.
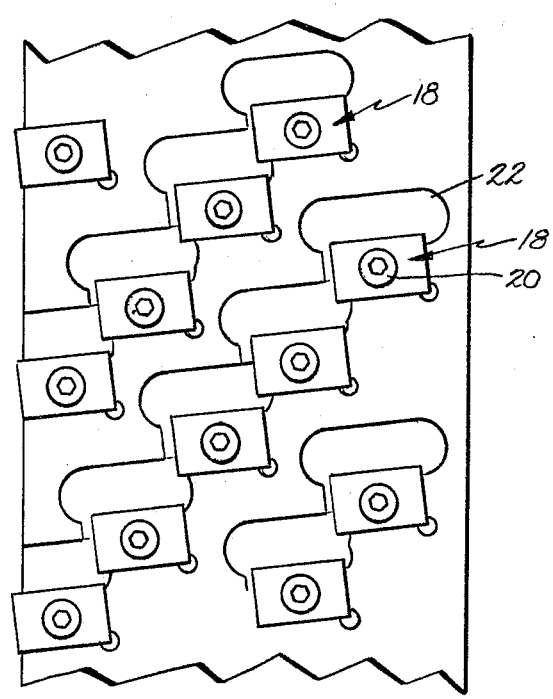
Fig. 3.
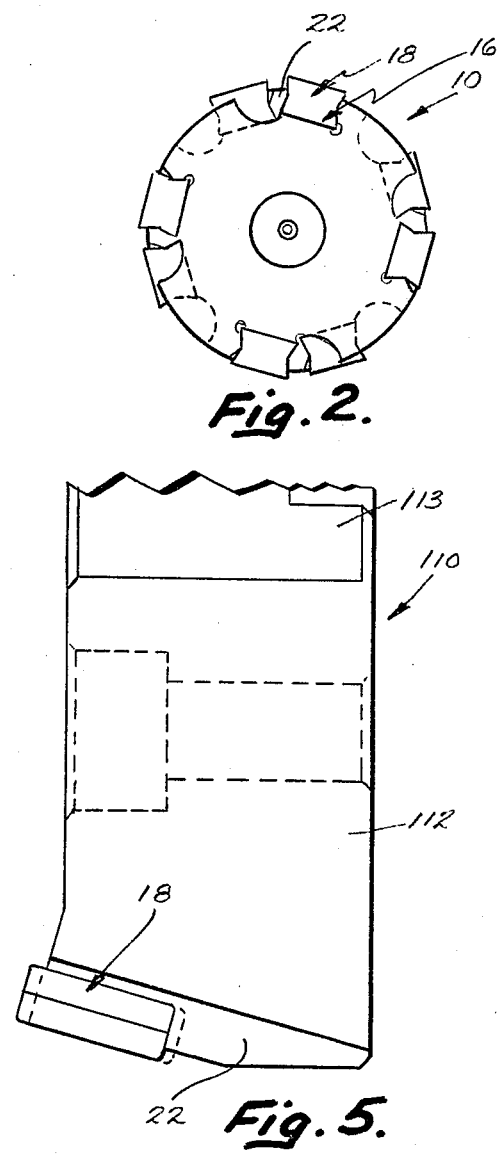
Fig. 2.
Fig. 5.

CUTTER BLADE

This is a continuation of application Ser. No. 544,134, filed on Oct. 21, 1983 and now abandoned.

BACKGROUND OF THE INVENTION

This invention relates to milling cutters, particularly notched milling cutter blades and a cutter assembly incorporating notched blades.

Notched milling cutter blades are known to be useful for high speed machining operations. Notched blades make smaller chips, reduce pressures and require less horsepower. With such blades, however, it is desirous to use positive axial rake in order to obtain proper chip flow and avoid damage by the chips to the blade, cutter, and workpiece. Negative axial rake tends to undesirably retain chips in the cutter chip slot, to the detriment of the work and cutter. Positive radial rake used in combination with negative axial rake amplifies this detrimental tendency.

Yet, it has been determined that the use of negative axial rake with positive radial rake can effect better cutting action. The problem is to obtain good chip removal while doing this. If negative radial rake is employed, then negative axial rake is normally used to encourage chip discharge as much as possible.

Another difficulty found to exist when attempts are made to use a notched blade at a rake angle is the interference resulting between a lateral wall of each notch and the corresponding rib which remains on the workpiece as the notched cutting edge moves along the workpiece.

SUMMARY OF THE INVENTION

The novel cutter of this invention enables high speed cutting by a notched cutter blade at selected axial and radial rakes, even at rakes that are the reverse of what are normally employed, i.e. enabling effective cutting at a negative axial rake and a positive radial rake. The cutter can also be employed with other rake combinations, negative or positive, as desired for the particular job.

The novel blade has concave, generally V-shaped front and rear edge surfaces. This V configuration at the front edge surface assists in chip movement into the chip pocket for effective chip removal from the cutter. At the rear edge surface, one portion of the V abuts a like oriented reference surface of a convex V-shaped back surface in the slot of the cutter body, while the other portion of this rear edge surface is at a slight clearance from the slot back surface.

The blade cutting edge notches are also specially configurated. These notches, which extend from the front edge surface through the adjacent side face, have lateral walls which diverge away from the cutting edge at an acute angle, achieving clearance from the workpiece rib left by the notch, whether the blade is operated at a positive or a negative axial rake.

If the blades are mounted around the periphery and along the axial length of a cylindrical cutter body, the like notched blades are also preferably mounted in axially offset blade pockets to cause the blade notches of circumferentially sequential blades to be unaligned with each other. This eliminates the need for different notch patterns on the blades, i.e. they can all be alike.

These and other objects, features, and advantages will be fully apparent upon studying the following detailed description along with the illustrative drawings.

BRIEF DESCRIPTION OF THE DRAWINGS

FIG. 1 is a side elevational view of one type of milling cutter assembly employing the invention;

FIG. 2 is an end elevational view of the cutter assembly in FIG. 1;

FIG. 3 is an expanded elevational view of the periphery of the cutter assembly in FIG. 1;

FIG. 5 is a fragmentary, side elevational view of the assembly in FIG. 4;

DESCRIPTION OF THE PREFERRED EMBODIMENTS

Figure 4:
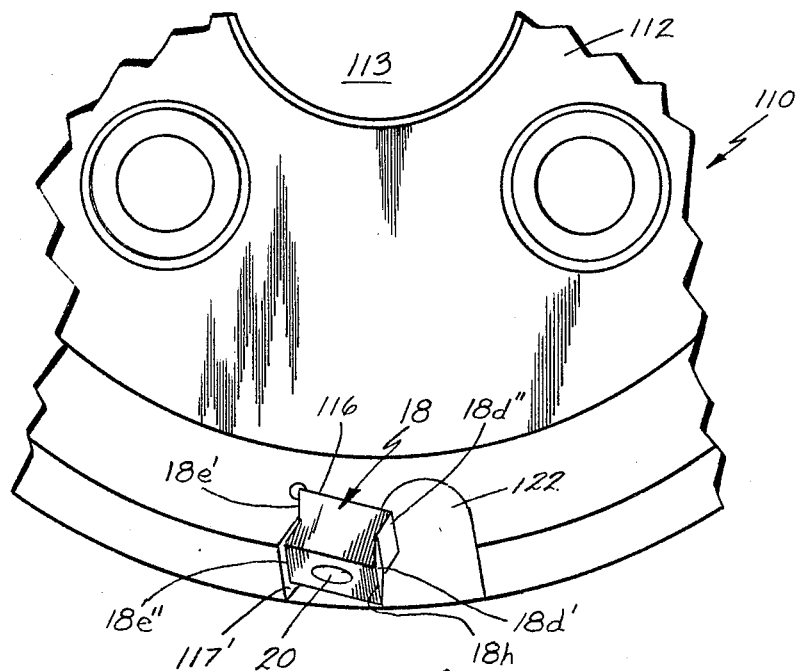
FIG. 4 is an enlarged, fragmentary, end elevational view of a second disc-type cutter assembly showing one of the insert blades.
Figure 8:
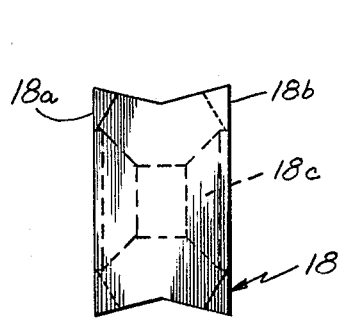
FIG. 8 is an end elevational view of the blade in FIG. 6.
Figure 6:
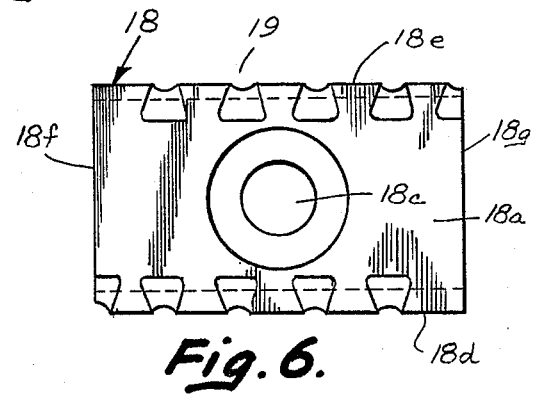
FIG. 6 is an enlarged, plan view of one of the cutter blades of this invention.
Figure 7:
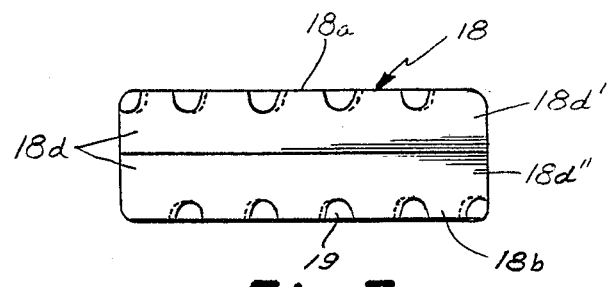
FIG. 7 is a side elevational view of the blade in FIG. 6.

Referring now to the drawings, it will be noted that the first embodiment illustrated in FIGS. 1–3 comprises a cylindrical milling cutter assembly as for surface milling, while the second embodiment in FIGS. 4 and 5 comprises a disc-type milling assembly. Both of these assemblies are intended to employ the notched cutter blades of which one is depicted in FIGS. 6–8, although the notches do not show in FIGS. 1–5. The milling cutter bodies can have either a shank to be received in a bore of a milling machine, or a bore to receive a shank of a milling machine. The embodiment of the invention depicted in FIGS. 1–3 comprises a milling cutter assembly 10 having a cylindrical cutter body 12 rotational on its axis X, with a conventional end spindle or shank 14 for mounting in a milling machine. Cutter body 12 has around its periphery and along its axial length a plurality of blade-receiving slots or pockets 16, each to receive an insert blade 18 secured to the body as by a threaded fastener 20 extending through the blade. Each blade receiving pocket has an adjacent, adjoining chip pocket 22 formed into the cutter body to receive the chip from the blade and discharge it.

In the depicted embodiment of FIGS. 1–3, the blade pockets are oriented at a small acute angle relative to an imaginary line on the cutter body periphery parallel to the rotational axis of the body. The blade pockets are also axially offset in a pattern such that circumferentially successive blades overlap in a manner to prevent alignment of notches of circumferentially successive blades. Hence the individual blades can have the same notch pattern, i.e. the blades can be identical; yet each blade effectively cuts off the "ribs" left by the notches of the preceding blade.

Each of the blades includes at least one cutting edge formed at the juncture between one of its two flat sides and one of its four edge surfaces. The blade is mounted in the cutter body to cause the cutting edge to project radially outwardly from the cutter body periphery (FIG. 2). Each of the blades includes a specially configurated front edge surface and rear edge surface to be described in more detail hereinafter. For convenience, these edge surfaces will be described in connection with the embodiment in FIGS. 4 and 5 because these figures most clearly illustrate the relationship thereof to the cutter body.

Referring to FIGS. 4 and 5, the milling cutter assembly 110 there shown has a disc-type cutter body 112 with a central bore 113 for mounting on a milling machine spindle, and a plurality of blade pockets 116 around its periphery to receive blades 18. Each blade pocket includes an adjoining chip pocket 122 which preferably, but not necessarily, extends through the cutter body from front to back.

Each blade 18, normally formed of a compressed and sintered tungsten carbide material, has a central opening therein for insertion of a threaded mounting fastener 20 (FIGS. 3 and 4). The polygonal blade, here shown to be generally rectangular in shape, has two enlarged side faces 18a and 18b with this opening 18c extending therebetween. This four-sided blade also has four side surfaces including a front edge surface 18d, a back edge surface 18e identical thereto and interchangeable therewith, and two end edge surfaces 18f and 18g. The like front and back edge surfaces are specially configurated. Specifically, each has a concave, generally V-shaped configuration, with the apex of the V being basically at the middle of the edge surface and oriented parallel to the side faces. This V-shaped configuration thus forms two edge surface portions for each of these front and back edge surfaces. These edge surface portions are at an acute angle preferably of about 75° to the adjacent side face. It will be understood that the terms "front" and "back" have relationship to the position of the blade in the cutter body, such that, when the blade is rotated 180°, the front becomes the back and vice versa.

On the front edge surface (see FIG. 4 for example), the radially outer edge surface portion 18d' forms a juncture with the outer side face of the blade to create a cutting edge 18h that protrudes beyond the cutter body periphery. The radial inner portion 18d" of the front edge surface specially cooperates with the adjoining chip pocket 122 in the cutter body. That is, the metal chip severed from the workpiece by the cutting edge curls diagonally along the radial outer portion 18d' of this front edge surface until it reaches the apex in this front edge surface, at which time it is turned back diagonally by the lower portion 18d''', for a smooth flow into the chip pocket 122 where it continues to be curled radially outwardly for complete discharge from the cutter assembly in a smooth action. This shape of the front edge surface of the blade has been found to prevent undue wear on the chip pocket and cutter body. The back edge surface 18e of the blade has the same special configuration as that of the front edge surface. This special configuration serves a different function at the back edge surface, however. The radially inner portion 18e' lies in engagement with a like angulated reference surface portion 117 on a convex, generally V-shaped back surface of the cutter body blade slot. Thus, each blade can be accurately located relative to the cutter body. Moreover, the cutting or machining pressure on the blade tends to maintain the blade in proper positive abutment with this reference surface. The radially outer portion 18e" of the back edge surface is spaced at a slight clearance from the adjacent radially outer portion 117' of the slot back surface (see FIG. 4).

In the particular blade depicted, there are four cutting edges, each formed by the juncture of one of the two flat side surfaces with the front and back edge surfaces. These cutting edges are notched, the notches having a special configuration. These notches are depicted in FIGS. 6 and 7 as being four in number in the main portion of the cutting edge, and a fifth notch at the leading corner of the cutting edge. Obviously the number of notches can vary. Each notch extends through the side surface and the adjoining edge surface portion and thus through the juncture therebetween forming the cutting edge.

In the area where each notch extends through the side surface of the blade, the side walls of the notch are divergent away from the cutting edge such that the width of the notch at the cutting edge is smaller than the width of the notch at its base. Each side wall is at an acute recession angle relative to a plane perpendicular to the cutting edge. Usually this acute recession angle is within the range of about 3°–20°, more typically being about 10°, the minimum angle depending upon the axial rake angle of the blade in the cutter body to be used. That is, the acute recession angle should be larger than the axial rake angle used. Thus, if a 5° negative rake angle of the blade in the cutter body is employed, the acute recession angle of the notch walls should be greater than 5°, to prevent the notch wall from interfering with the wall of the rib which is left on the workpiece as the cutting edge and its notch traverse the workpiece.

Figure 9:
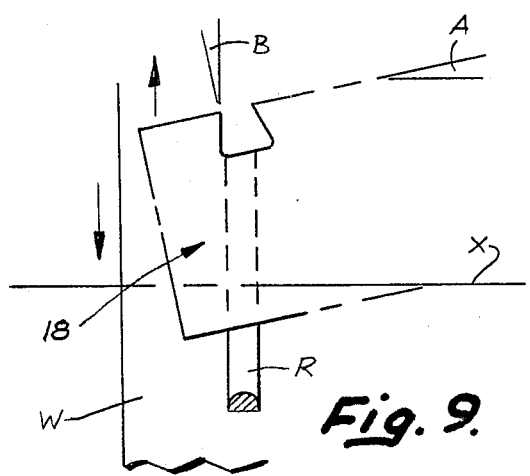
FIG. 9 is a diagrammatic fragmentary view illustrating a cutting operation.

In operation, a plurality of the like special blades are inserted in the cutter body pockets and secured in position against the reference surface of the respective pockets such that a cutting edge on each blade protrudes to remove material from the workpiece. The particular blade selected will have an acute recession angle on the side walls of the blade notches at least as large as the axial rake angle of the blade in the cutter body. The novel blades can accommodate either negative or positive rake because both side walls of each notch recess in the manner indicated. An example of this is depicted diagrammatically in FIG. 9 wherein W represents a portion of a workpiece, and a portion of the adjacent side face, cutting edge and one notch of blade 18 are shown in phantom lines. The axial rake angle of the blade relative to the cutter body axis X is A. The acute recession angle of each side wall of the notch is B. During cutting, and consequent relative movement between the blade and workpiece as indicated by opposite arrows, each blade notch leaves a rib R on the workpiece. Recession angle B is greater than rake angle A to prevent interference rubbing of a notch wall on rib R which is formed temporarily until removed by the succeeding blade (not shown). In the blade depicted in FIG. 9, the "left" notch wall requires this acute recession angle for clearance from the rib R. The "right" notch could, in this illustrative example, be normal to the cutting edge, i.e. not recessed, and still have adequate clearance from rib R. However, since the blade could be employed by the ultimate purchaser in a negative or positive rake arrangement, it is preferable to have an acute angle recess on both sides of each notch. Feeding the rotational cutter body relative to the workpiece causes the notched cutting edges to successively remove material from the workpiece, with the notches in each blade leaving a plurality of ribs on the workpiece surface. The successive blade removes the ribs from the preceding blade even though the blades are alike, because the blades are axially offset in the pockets relative to each other so that the notches of circumferentially successive blades are unaligned. The chip of metal being removed by each blade is forced by the radially outer edge surface portion adjacent the cutting edge to travel radially inwardly to the apex of the V configuration, where the chip is turned by the apex of the V into the chip pocket to travel axially out of the cutter without interference with the cutter assembly and operation.

With some milling cutter assemblies, the operator might not use a notched blade in each successive pocket. Specifically, a notched blade might be followed circumferentially by a thin rib-removal blade which is unnotched and not as thick as the notched blade it follows. This thin blade serves to cut off the ribs left by the preceding notched blade.

It will be apparent to those in the art that the unique concept and arrangement set forth herein can be employed with certain minor modifications to suit a particular type of workpiece, cutter body, or operation to be performed, without departing from the invention. Thus, the invention is not intended to be limited to the particular embodiments depicted as illustrative, but only by the scope of the appended claims and the reasonable equivalents thereto.

The embodiments of the invention in which an exclusive property or privilege is claimed are defined as follows:

1. A milling cutter assembly comprising:
    a cutter body having a plurality of spaced insert blade stations around its periphery, and oriented to rotate about an axis disposed generally perpendicular to the direction of cutter feed; said stations each including a blade receiving slot, with a convex generally V-shaped back surface in said slot, one portion thereof forming an inner reference surface for a blade;
    a plurality of cutter blades in said station slots, each cutter blade having a blade body with a pair of opposite side faces, a plurality of peripheral edge surfaces, and cutting edges formed at the junctures of two opposite edge surfaces with said side faces; wherein said cutter blades each include:
    a plurality of laterally spaced apart notches extending completely through at least one of said cutting edges to reduce chip width for improved chip removal, and during cutting forming a plurality of corresponding upstanding ribs in the operating surface of the workpiece;
    means for removing the ribs from the operating surface of the workpiece before a subsequent pass of said cutter blade through the workpiece;
    means for mounting said cutter blade in one of said stations, and orienting said one cutting edge at an acute, predetermined axial rake angle to the rotational axis of said cutter body;
    said notches through said one cutting edge being defined by opposite sidewalls that are oriented in a mutually divergent relationship in a direction away from said cutting edge, wherein each of said notch sidewalls is disposed at a small acute recession angle to a plane normal to said cutting edge, whereby said notch sidewalls do not abut the upstanding ribs formed by said notches as said cutter blade cuts through the operating surface of the workpiece; and
    said two opposite edge surfaces of each of said cutter blades being concave, generally V-shaped in configuration; one of said two edge surfaces having a portion of the V positioned in reference engagement with said cutter body reference surface portion, and the other portion of the V being spaced slightly from said convex generally V-shaped back surface for secure cutter blade mounting.

2. The assembly in claim 1 wherein said blades are at a negative axial rake.

3. The assembly in claim 2 wherein said blades are at a positive radial rake.

4. The assembly in claim 3 wherein said acute recession angle is in the range of about 3°–20°.

5. A milling cutter assembly, comprising:
    a cutter body having a plurality of insert blade stations spaced apart about its periphery, and oriented to rotate about an axis disposed generally perpendicular to the direction of cutter feed;
    a plurality of cutter blades mounted in said blade stations;
    at least one of said cutter blades, having a blade body with a pair of opposite side faces, a plurality of peripheral edge surfces, and a cutting edge formed at the juncture of at least one of said peripheral edge surfaces with one of said side faces; said one cutter blade including a plurality of laterally spaced apart notches extending completely through said cutting edge to reduce chip width for improved chip removal, whereby during cutting a plurality of corresponding upstanding ribs are formed in the operating surface of the workpiece, which ribs are immediately removed from the operating surface of the workpiece by a subsequent one of said cutter blades before a subsequent pass of said one cutter blade through the workpiece; wherein
    said cutter blade cutting edge is oriented at an acute, predetermined axial rake angle to the rotational axis of said cutter body; and
    said notches through said cutting edge are defined by opposite sidewalls that are oriented in a mutually divergent relationship in a direction away from said cutting edge, wherein each of said notch sidewalls is disposed at a small acute recession angle to a plane normal to said cutting edge, whereby said notch sidewalls do not abut the ribs formed by said notches as said cutter blade cuts through the operating surface of the workpiece.

6. The cutter assembly of claim 5, wherein:
    said acute recision angle is in the range of about 3–20 degrees.

7. The cutter assembly of claim 6, wherein said cutter blade is at a negative axial rake.

8. The cutter assembly of claim 7, wherein said cutter blade is at a positive radial rake.

9. The cutter assembly of claim 8, wherein:
    said subsequent one of said cutter blades comprises a second one cutter blade mounted in said cutter body in a laterally offset relationship to said first-named one cutter blade.

10. A milling cutter assembly, comprising:
    a cutter body having at least one blade station positioned at its periphery; said blade station including a blade receiving slot defined by a flat base surface and a convex, generally V-shaped back surface with inner and outer reference surfaces; said inner reference surface being flat, positioned radially inwardly of said outer reference surface, and intersecting said base surface at a predetermined acute angle; said blade receiving slot including a relief channel extending along the intersection of said inner reference surface and said base surface;

at least one cutter blade having opposite side faces and a plurality of peripheral edge surfaces, wherein one of said side faces intersects a first one of said peripheral edge surfaces to form a cutting edge, and the other one of said side faces intersects a second one of said peripheral edge surfaces at an acute angle which is substantially commensurate with said predetermined acute angle of said blade receiving slot to form a mounting edge located opposite to said cutting edge; said second peripheral edge surface also intersecting a third peripheral edge surface at an angle greater than said V-shaped back surface;

means for retaining said cutter blade in a predetermined orientation in said blade receiving slot, wherein said other side face and said second peripheral edge surface of said cutter blade abut said base surface and said inner reference surface respectively of said blade receiving slot, with the mounting edge of said cutter blade disposed within said relief channel, and said third peripheral edge surface of said cutter blade spaced apart from the second surface of said blade receiving slot, whereby cutting forces wedge said cutter blade securely into said blade receiving slot.

11. The milling cutter assembly of claim 10, wherein:
said cutter blade has a symetrical plane shape; and
said mounting edge defines a second cutting edge.

12. The milling cutter assembly of claim 11, wherein:
said cutter blade retaining means includes a bolt extending radially through said cutter blade, and threaded in said cutter body.

* * * * *